2,701,256

POLYACETYLATED DERIVATIVES OF CYSTEAMINE

Richard Kuhn and Guenter Quadbeck, Heidelberg, Germany

No Drawing. Application July 2, 1952, Serial No. 296,924

6 Claims. (Cl. 260—455)

This invention relates to novel polyacetyl derivatives of cysteamine, and to a novel and improved procedure by which they may be prepared.

More particularly, the invention relates to novel polyacetylated derivatives of cysteamine, especially to N,S-diacteylcysteamine and N,N,S-triacetylcysteamine, which new compounds may be readily prepared by treating N-monoacetylcysteamine with an acetylating agent.

The starting material used in forming the novel polyacetylated derivatives of cysteamine, i. e. N-monoacetylcysteamine, $CH_3.CO.NH.CH_2.CH_2.SH$, may be readily prepared by reacting thioacetic acid with ethylenimine. A suitable procedure for preparing N-monoacetylcysteamine from thioacetic and ethylenimine is disclosed in the patent application Ser. No. 240,042 filed by Richard Kuhn and Guenter Quadbeck on August 12, 1951.

The new chemical compounds, N,S-diacetylcysteamine and N,N,S-triacetylcysteamine, have valuable pharmacological properties, exhibiting strong and somewhat persistent blood pressure reducing activity.

Among suitable acetylating agents with which N-monoacetylcysteamine may be reacted to produce the new di- and tri-acetylated derivatives, there may be specifically mentioned ketene and acetic anhydride. Ketene is particularly satisfactory for producing N,S-diacetylcysteamine, which is the product first resulting when N-monoacetylcysteamine is reacted with ketene. By reaction with further amounts of ketene, the N,S-diacetylcysteamine is converted to N,N,S-triacetylcysteamine. Reaction of N-monoacetylcysteamine with acetic anhydride results in the preparation of N,N,S-triacetylcysteamine directly, without formation of N,S-diacetylcysteamine.

In carrying out the reaction, the N-monoacetylcysteamine and the acetylating agent are brought together, either at room temperature, or at an elevated temperature, such as one corresponding to the boiling point. Reaction at an elevated temperature is most easily effected by heating the reactants in a reflux condenser. The novel polyacetylated derivatives may be recovered from the reaction mixture by fractional distillation.

The following examples are illustrative of the invention:

Example 1

Thirty-two parts of N-monoacetylcysteamine are heated at the boiling point under a reflux condenser for one hour with 160 parts of acetic anhydride. The excess acetic anhydride and the acetic acid formed are then distilled off under reduced pressure. The residue is fractionally distilled. At a pressure equivalent to 15 millimeters of mercury, the major part distills over at 164–166° C. In case the distillate does not solidify on cooling with ice, it is again distilled. Thirty-six parts of N,N,S-triacetylcysteamine are obtained as a colorless oil. It is only slightly soluble in water. 250 mg. per kg. body weight effects a blood pressure reduction in rats of approximately 50 mm. for about 24 hours.

Example 2

A strong current of ketene is passed into a solution of 100 parts of N-monoacetylcysteamine in 100 parts of ether at room temperature. When no more free SH groups are identifiable, the ether is distilled off. The residue distills over at a pressure equivalent to 15 millimeters of mercury almost completely, at a temperature of 180–183° C. The distillate solidifies at ordinary (room) temperature. It consists of N,S-diacetylcysteamine of melting point 29–30° C. The yield is equivalent to 90–95% of the theoretical. On longer reaction with ketene increased amounts of N,N,S-triacetylcysteamine, as described in Example 1, are formed.

The diacetyl derivative is water-soluble. In an aqueous, particularly in any weakly alkaline aqueous solution, acetic acid is gradually split off.

200 mg. per kg. body weight causes a blood pressure reduction in rats from 100–130 to 50–70 mm. for approximately 48 hours. A dosage of 100 mg. per kg. body weight has approximately the same blood pressure reducing effect in rats, but it lasts for only 24 hours.

The above description and illustrative examples are intended to be typical only. Modifications thereof, as well as variations therefrom, which conform to the spirit of the invention are intended to be included within the scope of the appended claims.

We claim:
1. A polyacetylated derivative of cysteamine selected from the group which consists of N,S-diacetylcysteamine and N,N,S-triacetylcysteamine.
2. N,S-diacetylcysteamine.
3. N,N,S-triacetylcysteamine.
4. The process for preparaing polyacetylated derivatives of cysteamine which comprises reacting N-monoacetylcysteamine with an acetylating agent selected from the group which consists of ketene and acetic anhydride.
5. The process of preparing a compound selected from the group which consists of N,S-diacetylcysteamine and N,N,S-triacetylcysteamine which comprises reacting N-monoacetylcysteamine with ketene.
6. The process of preparing N,N,S-triacetylcysteamine which comprises reacting N-monoacetylcysteamine with acetic anhydride.

References Cited in the file of this patent

UNITED STATES PATENTS

| | | |
|---|---|---|
| 2,406,362 | Farlow | Aug. 27, 1946 |
| 2,509,483 | Crouch | May 30, 1950 |
| 2,550,141 | Doumani et al. | Apr. 24, 1951 |

OTHER REFERENCES

Linderstrom-Lang: Jour. Biol. Chem., vol. 137 (1941) 443–446.